United States Patent [19]

Levendusky et al.

[11] Patent Number: 4,705,927
[45] Date of Patent: Nov. 10, 1987

[54] COOKING UTENSIL FOR COMBINED MICROWAVE AND STEAM COOKING

[75] Inventors: Thomas L. Levendusky, Greensburg; Arthur Benson, Pittsburgh; Richard W. Lunden, Leechburg, all of Pa.

[73] Assignee: Aluminum Company of America, Pittsburgh, Pa.

[21] Appl. No.: 896,438

[22] Filed: Aug. 14, 1986

[51] Int. Cl.4 .............................................. H05B 6/80
[52] U.S. Cl. ..................... 219/10.55 E; 219/10.55 M; 99/DIG. 14; 426/243
[58] Field of Search ................ 219/10.55 E, 10.55 F, 219/10.55 M, 10.55 R; 99/DIG. 14, 451; 426/241, 243, 234, 107, 523; 126/369

[56] References Cited

U.S. PATENT DOCUMENTS

| | | | |
|---|---|---|---|
| 2,714,070 | 7/1955 | Welch | 426/234 |
| 3,659,584 | 5/1972 | Doyle et al. | 126/369 |
| 3,777,099 | 12/1973 | Levinson | 219/10.55 |
| 3,854,023 | 12/1974 | Levinson | 219/10.55 |
| 3,985,990 | 10/1976 | Levinson | 219/10.55 |
| 3,985,991 | 10/1976 | Levinson | 219/10.55 |
| 4,027,132 | 5/1977 | Levinson | 219/10.55 |
| 4,306,133 | 12/1981 | Levinson | 219/10.55 |
| 4,317,017 | 2/1982 | Bowen | 219/10.55 |
| 4,413,167 | 11/1983 | Martel et al. | 219/10.55 |
| 4,439,656 | 3/1984 | Peleg | 219/10.55 |
| 4,501,946 | 2/1985 | Nibbe et al. | 219/10.55 |
| 4,529,089 | 7/1985 | Gasbarra et al. | 206/525 |
| 4,558,198 | 12/1985 | Levendusky et al. | 219/10.55 |
| 4,560,850 | 12/1985 | Levendusky et al. | 219/10.55 |

Primary Examiner—Philip H. Leung
Attorney, Agent, or Firm—Elroy Strickland; J. Stewart Brams

[57] ABSTRACT

A novel and improved microwave oven cooking utensil wherein a water absorbing member generally underlies a microwave opaque cooking container such that food contained in the container may be cooked in a microwave oven through direct exposure to microwave radiation and indirect heating of the container by steam evolved from the water absorbing member upon simultaneous exposure thereof to microwave radiation.

9 Claims, 1 Drawing Figure

U.S. Patent  Nov. 10, 1987  4,705,927
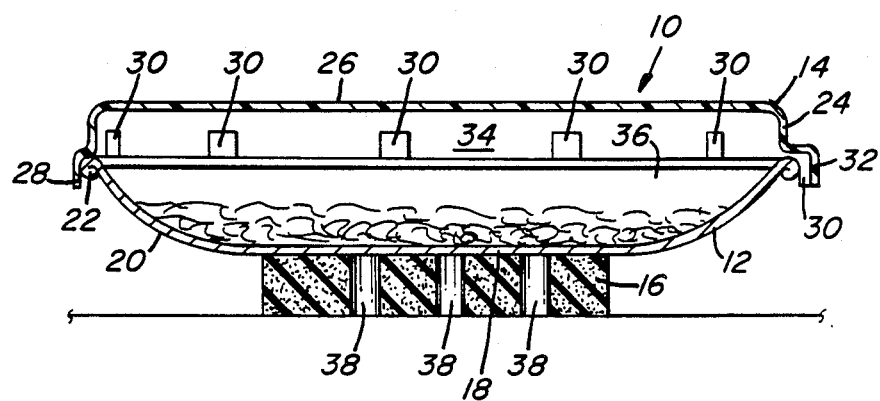

COOKING UTENSIL FOR COMBINED MICROWAVE AND STEAM COOKING

BACKGROUND OF THE INVENTION

The present invention relates generally to containers for microwave cooking. The prior art includes numerous examples of utensils for cooking foodstuffs in a microwave oven partially or entirely by either direct or indirect steam heating of the foodstuff. For example, prior U.S. Pat. No. 4,560,850 discloses a microwave cooking container incorporating a steam port which opens to the interior of the container such that steam evolved from moisture in the foodstuff to be cooked upon heating thereof by microwave exposure passes through the steam port in heat exchange relationship with exterior surfaces of the container to thereby indirectly heat portions of the contained foodstuff by heating corresponding portions of the container. U.S. Pat. No. 4,529,089 discloses a food container having a baffle which receives ice chips. During cooking the ice chips are converted to steam which is then directed to the cooking chamber of the container for steaming of a foodstuff contained therein.

U.S. Pat. No. 4,501,946 discloses a device for cooking foods with microwaves wherein a water and vapor or steam space overlies a food containment chamber and communicates therewith by means of tubes hereby microwave energy converts water in the water space to steam which then is directed to the cooking chamber. U.S. Pat. No. 4,439,656 discloses a cooking container which is placed in a holder to define a space therebetween which is filled with liquid. The liquid absorbs microwave energy and heats, and the thermal energy is then transmitted through the food container and to the food contained therein. U.S. Pat. No. 4,413,167 discloses a microwave egg cooker wherein water in a container is heated to boiling by exposure to microwave radiation and the resulting steam heats a tray containing eggs such that the eggs are cooked by conduction rather than by microwave radiation. U.S. Pat. No. 4,317,017 discloses a steamer for use in a microwave oven wherein a water reservoir in the bottom of the steamer container is exposed to microwave radiation for heating of the water to produce steam. The foodstuffs to be steam cooked thereby shielded from exposure to microwave radiation.

Other U.S. Patents which include reference to evolution of steam or vapor in a microwave cooking utensil include U.S. Pat. Nos. 4,306,133; 4,027,132; 3,985,991; 3,985,990; and 3,854,023. U.S. Pat. No. 3,985,990 in particular discloses a chamber which can be filed with absorbent material to accumulate liquid waste products such as renderings from a foostuff being cooked. This patent also discloses a mode of operation for cooking wherein food is selectively heated, and so dried, by exposure to microwave radiation, and the hot vaper evolved from the drying is trapped to create a hot steam, heat insulating blanket encompassing the food. U.S. Pat. No. 3,411,433 discloses a foil product which forms a cooking or baking dish and is comprised of an upper, perforated layer of metal foil, an intermediate layer of absorbent material, and a lower or bottom layer of imperforate metal foil. Another patent of general interest with regard to the prior art of microwave cooking as it relates to the present invention is U.S. Pat. No. 3,777,099.

In spite of extensive efforts directed toward improvement of microwave cooking systems, there remains a need in the art for cooking systems and utensils which will permit a greater degree of control over distribution of thermal energy with the foodstuffs that are thawed, reheated or cooked in a microwave oven. This can comprise accelerated thawing of frozen foods, heating of thawed or refrigerated foodstuffs, cooking of raw foodstuffs including simmering or boiling of liquid foodstuffs, boiling of foods in water, baking of various foods including most notably pastry based foodstuffs such as pies, roasting, as of meats and the like, and steaming for any of a wide variety of foods including meats, vegetables, and even such pastry based foodstuffs as dumplings.

For any of the above examples, as well as others, any of a variety of microwave cooking techniques might be envisioned as the most desirable for proper cooking of the foodstuff. In the most general terms, proper cooking procedure of any given foodstuff will entail the exercise of control over the mode, intensity, and duration of the thermal energy to which the foodstuff is exposed.

BRIEF SUMMARY OF THE INVENTION

The present invention provides a novel and improved microwave cooking container which offers improved modes of control over thermal energy application to foodstuffs by providing a bed or pad of absorbent material upon which a container carrying the foodstuff is disposed during microwave cooking. The absorbent material is saturated with water or other suitable polar material and is exposed to microwave radiation during the cooking process whereby the liquid in the absorbant material is heated and evolves steam that rises spontaneously and passes in heat exchange relationship with the exterior of the container disposed thereon. The foodstuff thus is heated or cooked not only by microwave radiation exposure but in addition by indirect heating through steam heating of the exterior of the container.

Another aspect of the invention includes incorporation of steam ports or chimneys in the absorbent material to provide for additional heating of the steam and directing of the steam to the exterior surfaces of the container. The invention further contemplates a novel method of microwave cooking.

Among the benefits of the invention, it has been found that by use thereof the reheating time of frozen foods in a microwave oven is substantially reduced. More specifically, upon initiation of microwave cooking, microwave exposure quickly converts water in the absorbent material to steam which then thaws the frozen foods and starts heating same from the bottom. Microwave absorption by the water reduces the intensity of the direct microwave energy input to the foodstuff. Thus, it has been found in testing that at the approximate midpoint of the heating cycle, the temperature of the bottom of the foodstuff being cooked according to the present invention is considerably higher than the temperature of the top of the foodstuff. This is the opposite of normally anticipated microwave cooking behavior. Heating the foodstuff from the bottom maximizes the efficiency of the microwave radiation and thereby significantly shortens the total required heating time, especially for frozen foods. The initial bottom heating also provides the advantage of a reduced tendency for top burning in some frozen foods which require long heating cycles. The invention also contemplates steam from the absorbent material being directed to a space under a cover routinely used in microwave heating to cover the top of an otherwise open container. The presence of this steam adjacent the upper surface of the foodstuff further reduces the tendency of top burning.

It is therefore one general object of the invention to provide a novel and improved container system for microwave cooking.

Another general object of the invention it to provide a novel and improved method for cooking foodstuffs in a microwave oven.

A more specific object of the invention is to provide a container system for microwave cooking including an open or closed container which rests upon a pad of absorbent material, the absorbent material being saturated with water in preparation for cooking and being exposed to microwave radiation during the cooking process to thereby evolve steam which passes in heat exchange relationship with exterior surfaces of the container for indirect heating thereby of the contained foodstuff.

These and other objects and further advantages of the invention will become more readily apparent upon consideration of the following detailed description and the accompanying drawing in which the sole FIGURE is a sectioned side elevation of a microwave cooking container system according to the instant invention.

There is generally indicated at 10 in the FIGURE a container system for microwave cooking of foodstuffs and comprising an open-top, microwave opague dish or container of rigid metallic construction, such as stamped or pressed aluminum sheet. A microwave transparent top 14 optionally covers the open top of dish 12 and a pad of absorbent material 16 underlies the dish 12.

More specifically, the container 12 is formed as a bowl or tray having a bottom portion 18 which is contiguous with a peripheral, upwardly and outwardly projecting sidewall portion 20 which terminates in a rolled peripheral lip or rim 22. Cap 14 comprises a unitary molded plastic structure, for example, including a continuous peripheral sidewall portion 24 which is contiguous with a transversely extending top portion 26, and with a depending annular skirt portion 28 having an inner diameter of suitable dimension to permit skirt 28 to snugly overlap ve oven also resides in space 34 and is exposed to microwave radiation passing through the transparent cap 14 for cooking thereof. Of course, surfaces of container 12 are suitably coated as appropriate to prevent electrical arcing when used in a microwave oven. Such coating of metallic containers for microwave oven use is known in the art. See for example U.S. Pat. No. 4,558,198.

Of course it will be understood that container 12 may be used with or without cover 14 in microwave cooking, according to the desires of the particular chef and the nature of the foodstuff to be cooked. In either case, container 12 is placed atop absorbent pad 16, which should preferably be thicker than 0.125 inches and preferably between 0.5 and 2.0 inches in thickness. The absorbent pad 16 may be any suitable absorbent material such as cellulose sponge, thick paper toweling or similar paper composition, or any other suitably absorbent material which is transparent to microwave radiation. During microwave cooking, the water in the saturated absorbent pad 16 is quickly heated by microwave exposure and converted to steam which then rises spontaneously to contact exterior surfaces of bottom 18 and sidewall portion 20 of container 12 in heat exchange relation therewith. The thermal energy of the steam thus is transferred via conduction through the section thickness of container 12 and to the bottom portions of the foodstuff 36 being cooked to quickly thaw same (if a frozen food) and to further heat the foodstuff 36 from the bottom.

Of course, the foodstuff 36 is also simultaneously exposed to microwave radiation from above in a conventional microwave oven. Accordingly, the apparatus and method as above described maximizes the efficiency of microwave heating and thereby greatly shortens the total heating time, especially for frozen foods which are to be microwave thawed prior to microwave heating or cooking thereof.

Another aspect of the invention involves a combination of steam ports or chimneys 38 extending vertically within absorbent pad 16 to container bottom 18. These voids allow steam evolved from pad 16 to be further heated and to be maintained for a longer time in heat exchange contact with exterior portions of bottom 18 thus further reducing the heating time of the foodstuff 36. For example, tests undertaken have indicated a further 10% reduction in heating time of a frozen foodstuff, and/or a corresponding increase in the final temperature of the heated foodstuff when steam chimneys 38 are utilized.

The absorbent pad 16 preferably would be packaged in a dehydrated condition along with the foodstuff to be cooked. The consumer therefore would have only to wet the absorbent pad 16 suitably, place it under the container 16 in the microwave oven, and heat according to directions. When the cooling cycle is finished, tha absorbent pad 16 could be further used to clean the interior of the microwave oven of spilled or splashed food residues after it has cooled a sufficient length of time to eliminate any danger of burns.

From the above description, it will be clear that the method of this invention constitutes, inter alia, the steps of heating a foodstuff in a microwave oven by placing same in a microwave opaque container having a microwave transparent top or open top, and placing the container in the microwave oven atop a microwave transparent absorbent pad which is saturated with water such that the foodstuff to be heated receives thermal energy from multiple sources including at least direct microwave radiation exposure from above and indirect heating by conduction of steam heat through the section thickness of the container to lower postions of the foodstuff. The steam heat is generated by microwave heating of the water in the absorbent pad. It will be understood that all of the above disclosure of the apparatus of this invention which pertains to various modes of use thereof is a disclosure of the method of this invention as well.

Of course it will be appreciated that the inventors herein have contemplated various alternative embodiments of the invention, and certainly such would also occur to others versed in the art, once apprised of our invention. For example, container 12 need not necessarily be of pressed or stamped aluminum sheet construction but may be formed in other ways from other metals or alloys. Similarly, cap 14 may take any of a variety of forms and be made from any of a variety of materials consistant with the requirements of the invention. For example, a conventional flat paperboard cover of the type routinely used heretofore in microwave cooking may be suitable, with or without accommodation for ingress of steam into the enclosed cooking space 34. The overall proportions and dimensions of cap 14, container 12 and pad 16 may be varied within a wide design latitude consistant with the results sought. These and other embodiments and modifications having been envisioned and anticipated, it is our intent that the invention be construed broadly and limited only by the scope of the claim appended hereto.

We claim:

1. In a microwave opaque cooking utensil for use in microwave cooking of foodstuffs wherein a container includes a bottom portion which is engageable with a supporting surface and side portions projecting radially outwardly and upwardly of said bottom portion to form an upwardly open concave foodstuff receiving space which permits exposure of foodstuff contained therein to microwave radiation from a source located generally above the container, the improvement comprising:

a microwave transparent, water absorbing member, the entire body of which underlies said bottom portion and supports said container, said microwave transparent, water absorbing member being of a configuration with respect to said container and of a sufficient section thickness, that said member is exposed to microwave radiation from such a source whereby, when moistened with water and exposed to such microwave radiation, said water absorbing member evolves steam which passes therefrom over the side portions of the container for indirect steam heating of a foodstuff contained in the container, and steam chamber means formed in said water absorbing member to contain the evolved steam in heat exchange relationship with respect to said bottom portion of the container.

2. The improvement as claimed in claim 1 wherein said water absorbing member has a section thickness of at least 0.125 inch.

3. The improvement as claimed in claim 2 wherein said water absorbing member has a section thickness no greater than 2.0 inch.

4. The improvement as claimed in claim 3 wherein said water absorbing member has section thickness in the range of 0.5 inch to 1.0 inch.

5. A cooking utensil adapted for cooking foodstuffs in a microwave oven comprising:

a microwave radiation opaque container having a bottom portion of a given shape and a sidewall portion which projects radially outwardly and upwardly of said bottom portion to define a concave, upwardly opening bowl or tray which is adapted to contain such a foodstuff for cooking thereof by exposure to microwave radiation from a source located generally above said container;

a microwave transparent water absorbing means for evolving steam upon exposure thereof to microwave radiation;

the entire body of said water absorbing means being disposed beneath said bottom portion to support said container within such a microwave oven; said water absorbing means being configured to support said container at a sufficient elevation above the floor of such a microwave oven that said water absorbing means is exposed to microwave radiation from such a source;

said container including exterior surface portions which cooperate with said water absorbing means to conduct the thermal energy of such steam through said bottom and sidewall portions of said container to heat such a contained foodstuff; and steam chamber means formed in said water absorbing member to contain the evolved steam in heat exchange relationship with respect to said bottom portion of the container.

6. The utensil as claimed in claim 5 wherein said container is a formed metallic structure.

7. The utensil as claimed in claim 6 wherein said exterior surface portions include surface portions of said sidewall portion.

8. The utensil as claimed in claim 7 additionally including microwave radiation transparent cap means for covering said upwardly open bowl or tray.

9. A method of utilizing a microwave oven to heat a foodstuff in a microwave radiation opaque container comprising the steps of:

placing such a foodstuff in said container;

locating a liquid absorbing, microwave radiation transparent medium, moistened with water, subjacent a bottom portion of said container to support said container in such a microwave oven;

exposing such a contained foodstuff to microwave radiation from above;

simultaneously with said first mentioned exposing step, exposing a portion of said liquid absorbing medium underlying said bottom portion to microwave radiation to heat the absorbed water and evolve steam therefrom; and passing said evolved steam in heat exchange relationship with exterior surface portions of said container to heat lower portions of such a contained foodstuff by conduction of thermal energy from said evolved steam through said container to the contained foodstuff.

* * * * *

UNITED STATES PATENT AND TRADEMARK OFFICE
CERTIFICATE OF CORRECTION

PATENT NO. : 4,705,927

DATED : November 10, 1987

INVENTOR(S) : Thomas L. Levendusky, Arthur Benson, and Richard W. Lunden

It is certified that error appears in the above-identified patent and that said Letters Patent is hereby corrected as shown below:

| | |
|---|---|
| Col. 1, line 47 | After "thereby" insert --are--. |
| Col. 1, line 55 | Change "foostuff" to --foodstuff--. |
| Col. 1, line 58 | Change "vaper" to --vapor--. |
| Col. 3, line 30 | Change "opague" to --opaque--. |
| Col. 3, line 46 | After "overlap" delete --ve-- and insert --rim 22. (One or more open ports 30 may be integrally formed by outwardly projecting portions 32 of skirt 28 to provide for release of steam from the confines of space 34 enclosed by bowl 12 and cap 14.) A food item 36 to be cooked in a microwave--. |
| Col. 4, line 33 | After "finished" change "tha" to --the--. |
| Col. 4, line 49 | Change "postions" to --portions--. |

Signed and Sealed this

Nineteenth Day of April, 1988

Attest:

DONALD J. QUIGG

*Attesting Officer*

*Commissioner of Patents and Trademarks*